United States Patent
Van Wiemeersch et al.

(10) Patent No.: US 12,368,470 B2
(45) Date of Patent: Jul. 22, 2025

(54) PLACEMENT OF MOBILE WIRELESS DEVICE ON A DISPLAY PANEL WITH A HIDDEN ANTENNA

(71) Applicant: FORD GLOBAL TECHNOLOGIES, LLC, Dearborn, MI (US)

(72) Inventors: John R. Van Wiemeersch, Novi, MI (US); Jayanthi Rao, West Bloomfield, MI (US); Mark W. Larry, Macomb, MI (US); Eugene Karpinsky, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 358 days.

(21) Appl. No.: 18/135,310

(22) Filed: Apr. 17, 2023

(65) Prior Publication Data
US 2024/0348287 A1    Oct. 17, 2024

(51) Int. Cl.
| | |
|---|---|
| *H04B 5/00* | (2024.01) |
| *H01Q 1/32* | (2006.01) |
| *H04B 5/72* | (2024.01) |
| *H04M 1/725* | (2021.01) |
| *H04W 4/80* | (2018.01) |
| *H04W 76/14* | (2018.01) |

(52) U.S. Cl.
CPC ............ *H04B 5/72* (2024.01); *H01Q 1/3233* (2013.01)

(58) Field of Classification Search
None
See application file for complete search history.

(56) References Cited

U.S. PATENT DOCUMENTS

| | | | | |
|---|---|---|---|---|
| 7,154,483 | B2* | 12/2006 | Kobayashi | G06F 3/0418 345/173 |
| 8,989,670 | B2* | 3/2015 | Kiveisha | H04B 5/20 455/566 |
| 9,262,915 | B2* | 2/2016 | Clem | G08G 1/08 |
| 9,471,196 | B2* | 10/2016 | Abratowski | H04W 4/80 |
| 10,135,964 | B2* | 11/2018 | Nuescheler | G06F 3/017 |
| 10,244,476 | B2 | 3/2019 | Elangovan et al. | |

(Continued)

FOREIGN PATENT DOCUMENTS

| | | |
|---|---|---|
| EP | 2620845 B1 | 8/2018 |

OTHER PUBLICATIONS

CCC Digital Key Whitepaper, The Future of Vehicle Access, Car Connectivity Consortium LLC, 2023.

*Primary Examiner* — Tuan A Tran
(74) *Attorney, Agent, or Firm* — Frank L. Lollo; MacMillan, Sobanski & Todd, LLC

(57) ABSTRACT

A near-field communication (NFC) reader is integrated with a display panel in a passenger cabin of a vehicle by constructing a hidden antenna of the reader into a portion of the display panel. The display comprises a touchscreen display providing a display surface coincident with a touch-sensitive input detector. A trigger monitor is configured to detect a user activity by a user which is indicative of a potential for the user to attempt pairing of a mobile NFC device with the hidden antenna. A positioning messenger is configured to generate a depiction on the display surface indicating a region to be covered on the display surface by the mobile NFC device to align a mobile antenna on the mobile NFC device with the hidden antenna. The NFC device may be a smartphone, a key fob, or an NFC transponder card.

20 Claims, 5 Drawing Sheets

(56) References Cited

U.S. PATENT DOCUMENTS

| | | | |
|---|---|---|---|
| 10,396,430 B2 | 8/2019 | Que et al. | |
| 10,741,918 B2* | 8/2020 | Yamagishi | H01Q 7/00 |
| 10,900,800 B2* | 1/2021 | Herbst | B60K 35/00 |
| 10,957,133 B2 | 3/2021 | Elangovan et al. | |
| 11,265,068 B2* | 3/2022 | Gajula | H04B 7/086 |
| 11,593,054 B2* | 2/2023 | Chen | G06F 3/1454 |
| 11,749,904 B2* | 9/2023 | Kim | G06F 3/017 |
| | | | 343/718 |
| 11,893,830 B2* | 2/2024 | Zeng | G06V 40/172 |
| 11,917,495 B2* | 2/2024 | Berardino | H04W 4/029 |
| 2010/0167646 A1* | 7/2010 | Alameh | H04W 12/06 |
| | | | 455/41.2 |
| 2011/0267311 A1 | 11/2011 | Yeh | |
| 2012/0034888 A1 | 2/2012 | De Flaviis | |
| 2013/0162563 A1* | 6/2013 | Matsuoka | B60K 35/10 |
| | | | 345/173 |
| 2014/0282068 A1* | 9/2014 | Levkovitz | G06F 3/0482 |
| | | | 715/748 |
| 2018/0054509 A1* | 2/2018 | Nuescheler | H04W 76/14 |
| 2019/0082378 A1* | 3/2019 | Dziurda | H04W 4/48 |
| 2020/0159481 A1* | 5/2020 | You | G06F 3/1423 |
| 2022/0021127 A1* | 1/2022 | Kim | H01Q 21/28 |

* cited by examiner

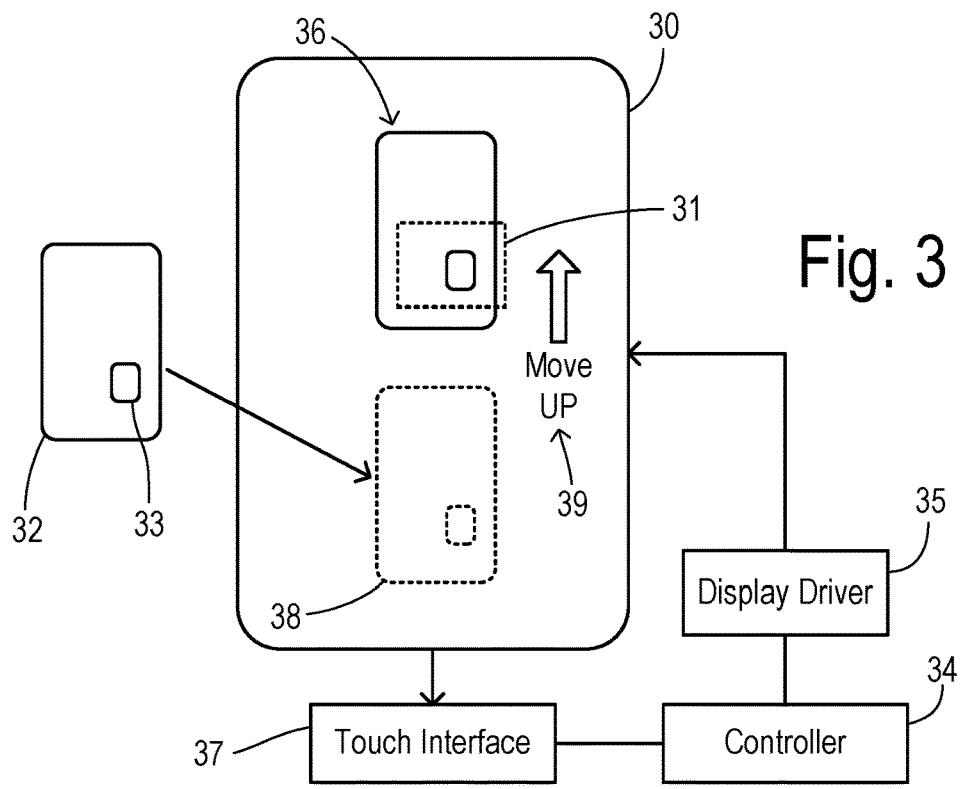
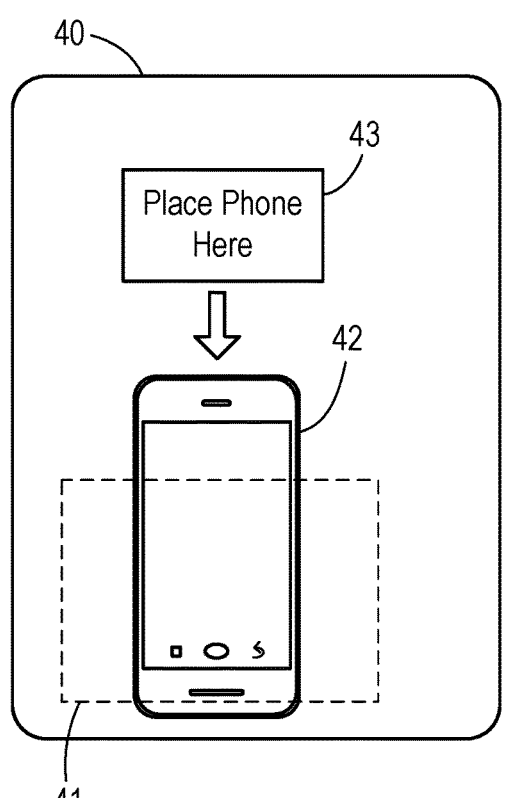
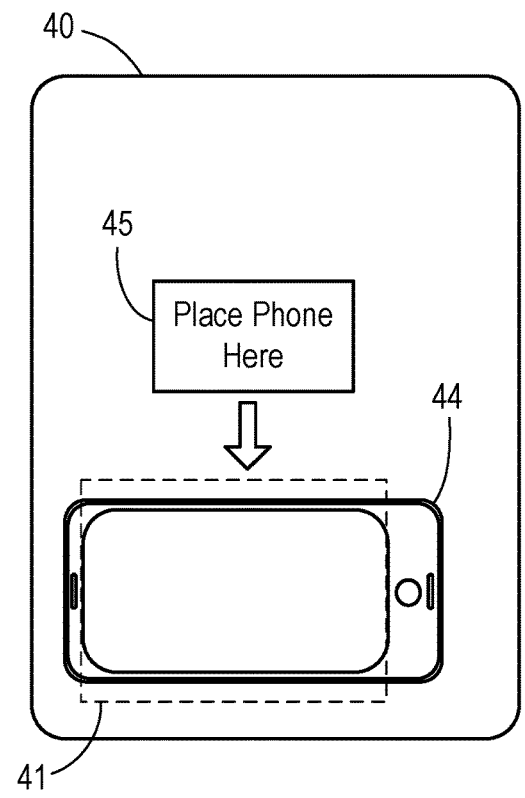

PLACEMENT OF MOBILE WIRELESS DEVICE ON A DISPLAY PANEL WITH A HIDDEN ANTENNA

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to using near-field wireless devices in a vehicle security system or infotainment system, and, more specifically, to interfacing a near-field wireless device with a vehicle antenna hidden within a display panel in a vehicle cabin.

Mechanical keys traditionally used for unlocking access doors to motor vehicles and for unlocking a steering wheel and starting a propulsion unit (e.g., internal combustion engine or electric vehicle powertrain) have been gradually replaced by passive and active electronic devices. Active devices include key fobs and smartphones (e.g., Phone-as-a-Key) with self-contained power supplies. Passive devices include transponders such as near-field communication (NFC) cards.

The electronic devices (e.g., a key fob, card, or a smartphone) wirelessly authenticates the user in order to gain access to the vehicle (e.g., door unlocking), activate the vehicle (e.g., ignition of a combustion engine or activating an electric vehicle powertrain), and perform other functions.

NFC devices are advantageous because their very short transmission range makes it difficult for third parties to intercept and copy security data. NFC hardware is included in many smartphones, so that an appropriate app installed on the smartphone can be configured to operate as a smart key for the user. In addition, dedicated NFC-based key fobs are also in use. In the case of a key fob, a batteryless RFID device can be used which obtains its power from the vehicle during a reading operation. Digital key protocols maintain vehicle security while enabling sharing and management of vehicle access. For example, a Digital Key standard has been published by the Car Connectivity Consortium.

For an NFC-based security system of a vehicle, the portable NFC unit carried by the user communicates with a fixed NFC unit (e.g., an NFC card reader) mounted to the vehicle. For example, an NFC reader for gaining access to the vehicle (e.g. for unlocking a door) may be mounted under a B pillar applique (e.g., on the vertical pillar located between the windows of a front door and a rear door on one side of the vehicle).

Once a user (e.g., driver) has gained access into the passenger cabin of a vehicle, the same or a different mobile wireless device may be used as a key for accessing secure functions such as starting the vehicle and for distinguishing one authorized user from another (e.g., for adopting customized settings such as seat position). Therefore, another NFC reader may be provided within the passenger cabin. However, considerations relating to space, price, and styling may make it difficult to accommodate an interior NFC reader in a common and familiar location across a vehicle manufacturer's product lines.

One or more display panels are typically deployed at the instrument panel or dashboard of a vehicle as part of a human machine interface (HMI). Often, a touchscreen display panel is used to create "soft" menu buttons for collecting user inputs. Display panels have also become available in which wireless antennas (including NFC antennas) have been integrated into the surface of the display. The antenna can remain hidden and has negligible influence on the display surface itself. Since the reading operation would only briefly obscure the display panel, the inclusion of an NFC antenna for an NFC reader in the display panel provides the functionality of an NFC key without having to monopolize space on any interior surfaces of the vehicle and allows one common location across a vehicle manufacturer's product lines.

Integration of an antenna into a display screen does have associated financial outlays. Therefore, it may be desirable to fabricate the antenna on only a portion of the display surface. Due to the short operating range of NFC signals, however, it may become possible for a mobile NFC device (e.g., smartphone) to be placed against the display surface in a location where its NFC antenna would not be sufficiently close to the hidden antenna to obtain adequate coupling. The smaller the proportion of the display surface covered by the hidden antenna, the greater the likelihood of placing the mobile device where insufficient coupling is achieved. In addition, a footprint on a typical smartphone where its NFC antenna is located varies for different brands and models of devices. A user may be unaware of which part of their mobile device is important to locate over an NFC reader. Even if a user was aware that the NFC reader antenna was located at a particular portion of the display surface, incorrect device placement may still result if the user covers the reader antenna with the wrong portion of the mobile device.

The foregoing considerations may apply to various types of wireless communication based on an antenna incorporated with a display panel, including Wi-Fi, Bluetooth® (e.g., Bluetooth Low Energy, or BLE), cellular, ultra-wideband (UWB), and near-field communication (NFC). In addition to secure communications, wireless coupling integrated into the display panel can include wireless charging (e.g., Qi).

As used herein, "mobile device" refers to any wireless unit capable of authenticating vehicle access and/or device charging using short range wireless communication, wherein the wireless unit is handheld. In addition to a smartphone, mobile devices may include, without limitation, a smart watch (such as an Apple® watch), a dedicated vehicle key fob, and an NFC card.

SUMMARY OF THE INVENTION

In one aspect of the invention, a vehicle apparatus comprises a touchscreen display providing a display surface coincident with a touch-sensitive input detector. A near-field communication device has a hidden antenna integrated into the display area. A trigger monitor is configured to detect a user activity by a user which is indicative of a potential for the user to attempt pairing of a mobile wireless device with the hidden antenna. A positioning messenger is configured to generate a depiction on the display surface indicating a region to be covered on the display surface by the mobile wireless device to align a mobile antenna on the mobile wireless device with the hidden antenna.

BRIEF DESCRIPTION OF THE DRAWINGS

FIG. 3 is a block diagram depicting a touch-sensitive display panel detecting an incorrect placement of the mobile wireless device and generating a display content which prompts a user to move the device into a correct placement.

FIGS. 4 and 5 are screenshots showing depictions on a display representing target placements for different mobile wireless devices.

DETAILED DESCRIPTION OF PREFERRED EMBODIMENTS

Figure 1:
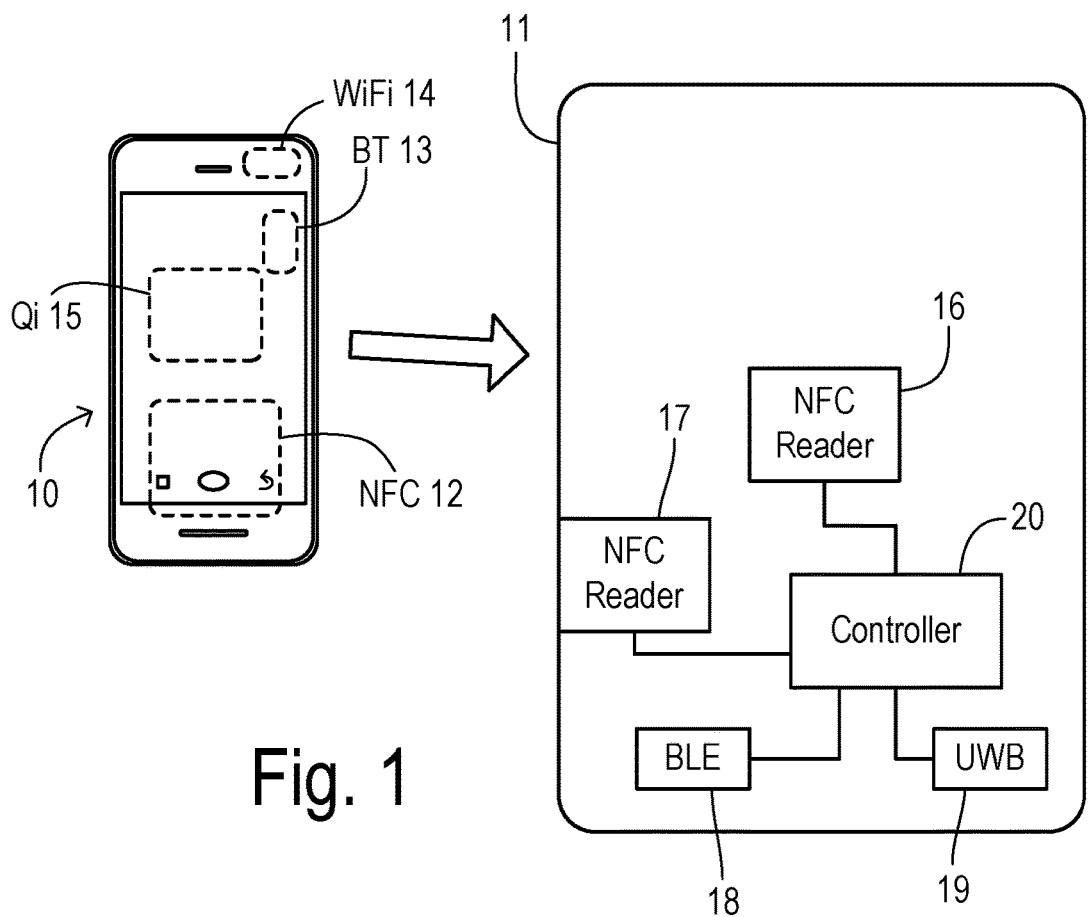
FIG. 1 is a block diagram showing portions of a vehicle security system and a mobile wireless device for authenticating a user.

Referring to FIG. 1, a wireless mobile device 10 operates as a remote security key with a vehicle 11. Mobile device 10 is shown as a smartphone incorporating various wireless technologies including several short-range systems requiring respective antennas. Depending upon a particular design of the different types of mobile devices, the different antennas may be located at different portions of the device. For mobile device 10, positions for an NFC antenna 12, Bluetooth® antenna 13, Wi-Fi antenna 14, and Qi charging antenna 15 are shown. The invention will be particularly illustrated in connection with an embodiment using near field communication NFC.

Vehicle 11 includes an NFC reader 16 disposed in an interior passenger cabin of vehicle 11 and an NFC reader 17 disposed in an exterior surface of vehicle 11. NFC reader 17 is positioned to enable a user outside the vehicle to utilize their mobile device 10 to unlock an entry door and gain access to vehicle 11. NFC reader 16 is accessible from within vehicle 11 to enable a user to access various vehicle functions, such as turning the vehicle ON (e.g., start its engine and engaging the transmission). NFC readers 16 and 17 are connected to a controller 20 for managing the security functions. Vehicle 11 may further include a Bluetooth® Low Energy (BLE) transceiver 18 and an ultra-wideband (UWB) transceiver 19. In embodiments of the present invention, NFC reader 16 and transceivers 18 and 19 may include respective antennas which may be integrated in a display panel within the interior of vehicle 11.

Figure 2:
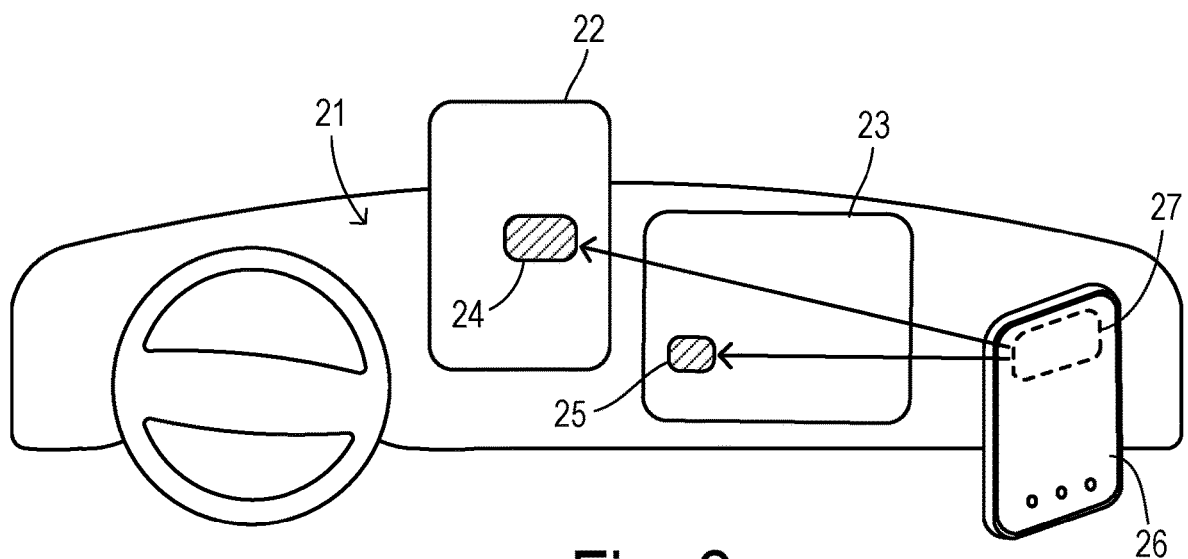
FIG. 2 is a schematic view showing display panels in a vehicle cabin which include hidden NFC antennas for coupling with the mobile wireless device.

As shown in FIG. 2, a front instrument panel 21 of a vehicle may incorporate one or more display panels such as a display panel 22 and a display panel 23. A particular vehicle may have one or more display panels with different sizes, positions, and orientations. A hidden NFC antenna 24 is integrated with display panel 22, and a hidden NFC antenna 25 is integrated in display panel 23. In a vehicle containing more than one display panel, inclusion of a hidden NFC antenna may typically be included in just one of the display panels. Display panels 22 and 23 may each be comprised of a touchscreen display panel, or the vehicle may include a combination of display panels with and without a touchscreen.

A mobile device 26 may be employed from within the vehicle in order to perform NFC communication via hidden antennas 24 or 25 by placing mobile device 26 with its NFC antenna 27 in close proximity to hidden antenna 24 or 25. Because of potential variations in the size and shapes of display panels 22 or 23, the size and shape of mobile device 26, and the particular footprint of NFC antenna 27 in mobile device 26, a user may have difficulty properly placing mobile device 26 on a surface of display panels 22 or 23 in a way that achieves close coupling between antennas. The invention aids a user in identifying a correct placement, and it may automatically monitor the placement and provide corrective instructions when needed.

FIG. 3 shows a display panel 30 with an integrated hidden NFC antenna 31 as part of an NFC reader for interacting with a mobile NFC device 32. An NFC antenna 33 in mobile device 32 has a layout as shown. The footprint of antenna 33 on mobile device 32 determines the portion of mobile device 32 which should be brought into close proximity with hidden antenna 31. When the vehicle enters a state in which the presence of a user is detected who can be expected to potentially interact with the NFC reader, a controller 34 responds by selecting an appropriate display content to assist the user. Controller 34 transfers the selected content to a display driver 35 which is coupled to display panel 32 in order to generate an on-screen depiction 36 which indicates a region to be covered by mobile device 32 in order to align mobile NFC antenna 33 with hidden antenna 31. Whenever controller 34 is able to identify a specific type of device (e.g., including its size and the placement of its NFC antenna), then depiction 36 may include a graphic representation of the particular mobile device.

In some embodiments, display panel 30 includes a touch-sensitive input detector with a touch interface 37. In the event that a user places mobile device 32 against touchscreen panel 30 at an incorrect location 38, then touchscreen interface 37 can be used to identify the incorrect placement. Controller 34 may compare incorrect placement 38 with target placement 36 in order to determine a difference between them and then generate a movement instruction 39 on display panel 30 to inform the user of a needed movement in order to eliminate the difference. A pressure-sensitive or resistive touchscreen could directly detect the touching of mobile device 32. For a capacitive touchscreen, a location of a user's hand may be detected and the location may be used to infer the position of mobile device 32. Alternatively, other means such as a camera could be used to monitor the placement of mobile device 32.

FIG. 4 shows another display panel 40 having a hidden antenna occupying a footprint 41 on a surface of display panel 40. A user's mobile wireless device is identified as a first type of mobile device (e.g., a particular model of smartphone). When use of an interior NFC reader is expected, then a graphic depiction 42 is generated on display panel 40 in a precise location where the corresponding NFC antenna of the mobile device is aligned within footprint 41. In addition to the graphic representation of the user's mobile device, a text message 43 may also be generated. In FIG. 5, a different device type is detected (e.g., a different model or manufacturer of a smartphone). A corresponding graphic representation 44 is shown on display panel 40 along with a text legend 45 in order to indicate to a user a proper placement of their mobile device. In some instances, an NFC antenna (or other type of antenna) within the mobile device may be optimized for interaction via either the front or back surface of the device. Graphic representation 42 or 44 may be generated to illustrate the front or back side of the device according to which side should be visible to the user when they place the mobile device against display panel 40.

Figure 6:
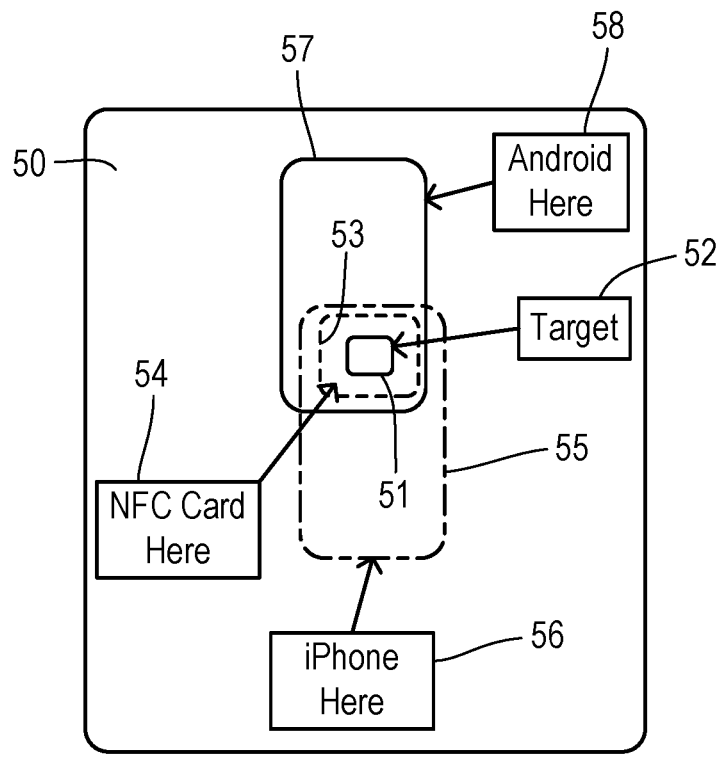
FIG. 6 is a screenshot showing a depiction indicating target placements for several different device types at once.

In some embodiments, the type of device being used by the user may not be determined in advance. Accordingly, a depiction which is presented on a display surface of the display panel in order to indicate the region to be covered on the display surface by the mobile wireless device may provide information pertinent to a group of different mobile devices or may provide generic information. For example, the depiction may be comprised of a plurality of graphic representations each corresponding to a respective one of a plurality of device types, wherein each graphic representation indicates a respective target placement for the respective device type. The device types may correspond to a group of mobile devices that have been previously used to access the particular vehicle, or may correspond to commonly used types of devices (e.g., an Apple® iPhone® or a Samsung® Galaxy®) or groups of devices that share a similar layout for their NFC antenna. FIG. 6 shows an example of a generic depiction on a display surface 50 in which a graphic representation 51 identifying a location of the hidden antenna is labeled as a "target" by a legend 52. When there is a potential that an NFC transponder card may be used to authenticate a user, then a position outline 53 may be shown along with a legend 54 indicating a target placement for the known (or a representative) NFC transponder card. When there is a potential that a smartphone of a first type (e.g., an Apple® iPhone®) may be used to authenticate a user, then a position outline 55 may be shown along with a legend 56 indicating a target placement for the smartphone. When there is a potential that a smartphone of a second type (e.g., an Android™ device) may be used to authenticate a user, then a position outline 57 may be shown along with a legend 58 indicating a target placement for the smartphone.

Figure 7:
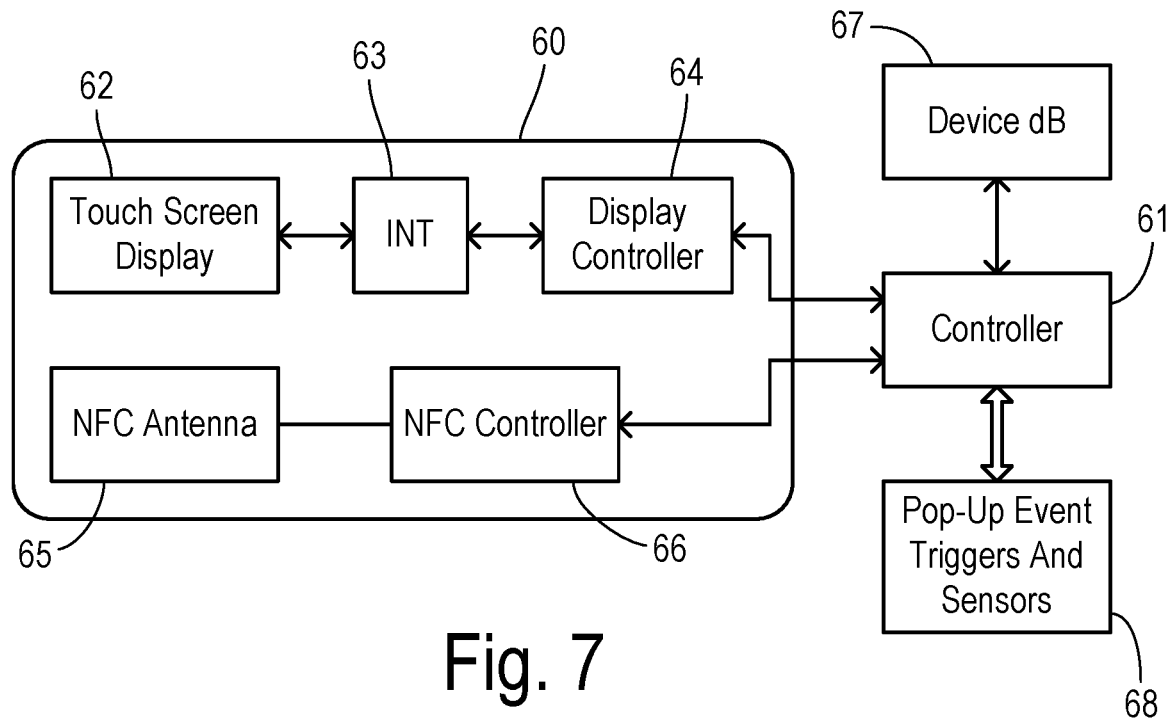
FIG. 7 is a block diagram showing one preferred embodiment of the invention.

FIG. 7 shows a vehicle apparatus in greater detail. A display panel 60 has a touchscreen display 62 providing a display surface coincident with a touch-sensitive input detector. A touch/display driver and interface 63 connect with a display controller 64 which communicates with a main controller 61. A near-field communication reader has a hidden NFC antenna 65 (integrated into display 62) and an NFC controller 66 which communicates with main controller 61. A trigger monitor detects user activity which is indicative of a potential for the user to attempt pairing of a mobile wireless device with the hidden antenna (e.g., actions which may lead up to a vehicle startup). The trigger monitor is comprised of controller 61 and an event block 68. Event block 68 may include vehicle modules and/or sensors configured to identify predetermined user activities such as 1) the driver door being open while the vehicle is in an Off state, 2) an engine start button is pushed with the engine Off and no key has yet been detected, 3) the vehicle has been unlocked via a keypad, remote transmitter, a cellular app (e.g., FordPass), or an exterior NFC reader, or 4) placement of the vehicle into a Valet mode.

Controller 61 operates as a positioning messenger to generate a pop-up message on display 62 when a trigger event is detected. A device database 67 is provided which is accessed by controller 61 to attempt to identify a device type of the mobile wireless device, 2) determine a layout of the mobile antenna for an identified device type, and 3) determine a target placement of the identified mobile wireless device on the display surface that will result in the alignment of the mobile antenna with the hidden antenna. The positioning messenger function is configured to generate a depiction on the display surface indicating a region to be covered on the display surface by the mobile wireless device, wherein the depiction may include a graphic representation of the identified mobile wireless device at the determined target placement when the type of device is discovered, wherein the depiction may include a plurality of graphic representations each corresponding to a respective device type when more than one potential device type is discovered, and wherein the depiction may include generic placement information (e.g., showing a hidden antenna location or showing commonly used devices) when no device type is discovered.

Device database 67 may include data defining the layouts of numerous devices usable with the vehicle security system and may maintain a list of devices which have actually been set up for accessing the individual vehicle. In one embodiment, the act of identifying the device type may be comprised of retrieving the device type from a stored list of authenticated devices that have been registered to grant access to the vehicle. For example, the most recently used one of the authenticated devices that appear in the stored list may be selected for the device type. The act of identifying the device type may also be comprised of exchanging messages between controller 61 and the mobile wireless device so that the mobile device can divulge what type of device it is.

In concert with a touch-sensitive input detector connected to touchscreen interface 63, controller 61 is further configured to determine an actual placement of the mobile wireless device (e.g., detecting actual contact of the mobile device on the display surface or inferring the mobile device location from contact by the user's hand). Controller 61 then determines a difference between the actual placement and the target placement, and generates a movement instruction on the display surface according to the difference.

Figure 8:
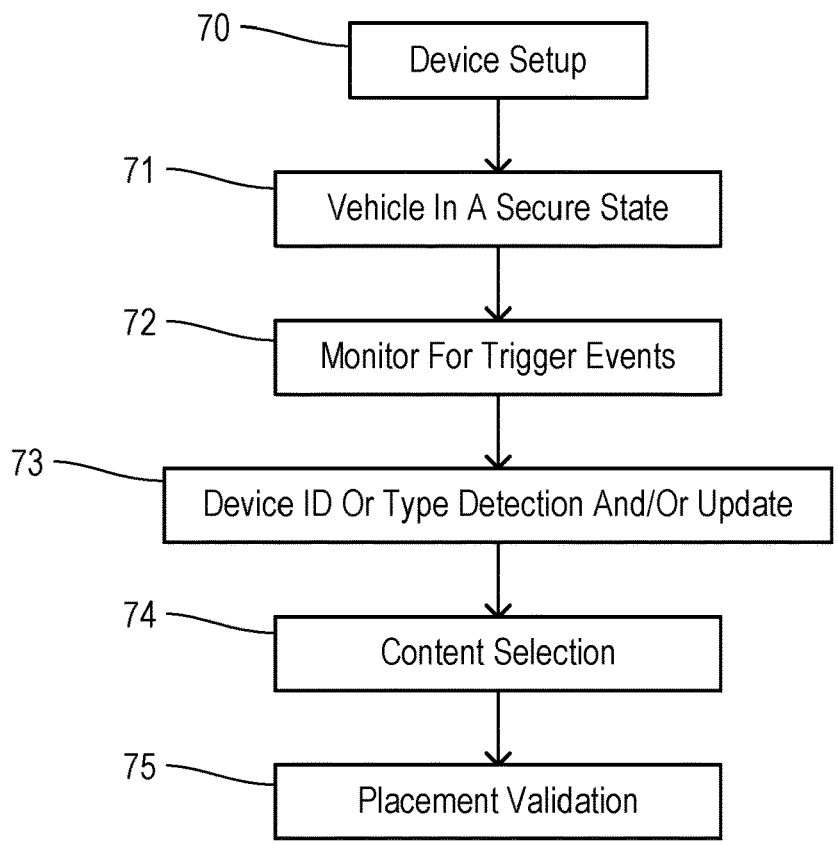
FIG. 8 is a flowchart showing one preferred method of the invention.

FIG. 8 shows a preferred method of the invention wherein a user's mobile device is set up for vehicle access in step 70. The setting up of a device to operate with the vehicle security system may be performed by direct interaction with the target vehicle or can be conducted using communication with a security server over a remote network as known in the art. The vehicle enters a secure state in step 71 during which the vehicle is locked and/or vehicle operation is inhibited. During the secure state, monitoring for trigger events is performed in step 72. Once a trigger event occurs, an attempt is made in step 73 to identify a device ID and/or a type of device that is being used or that may be expected to be used by the user. Whenever a new device is detected, a device database may also be updated in step 73. In step 74, appropriate content to be shown on the display panel is selected which will guide placement of an identified type of mobile device into the correct alignment with the hidden antenna. In step 75, an actual device placement on the display screen may be monitored in order to validate the user's attempt to align the mobile device with the correct location.

Figure 9:
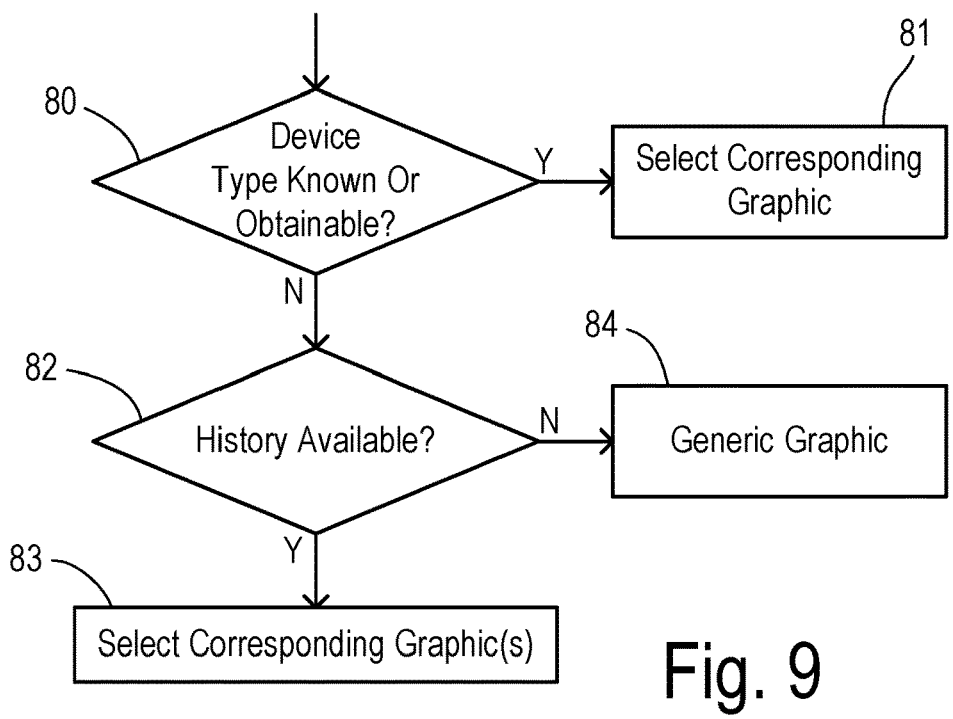
FIG. 9 is a flowchart showing a selection of content for the depiction of a target placement.

One preferred method for choosing the correct content to be displayed is shown in FIG. 9. In step 80, a check is performed to determine whether a device type is already known or may be obtainable based on possible communication links with mobile devices that are present. If a device type is discovered, then a corresponding graphic is selected in step 81 which may include a graphic representation of the discovered type of device. If the device type is not known or obtainable, then a check is performed in step 82 to determine whether there is an available history of recent devices that have been used to access the vehicle. If so, then the device or devices are obtained from the history, and they are used to select corresponding graphics in step 83. If no history is available, then a generic graphic may be selected in step 84 whereby the user may still be able to infer a usable placement of their mobile device.

Figure 10:
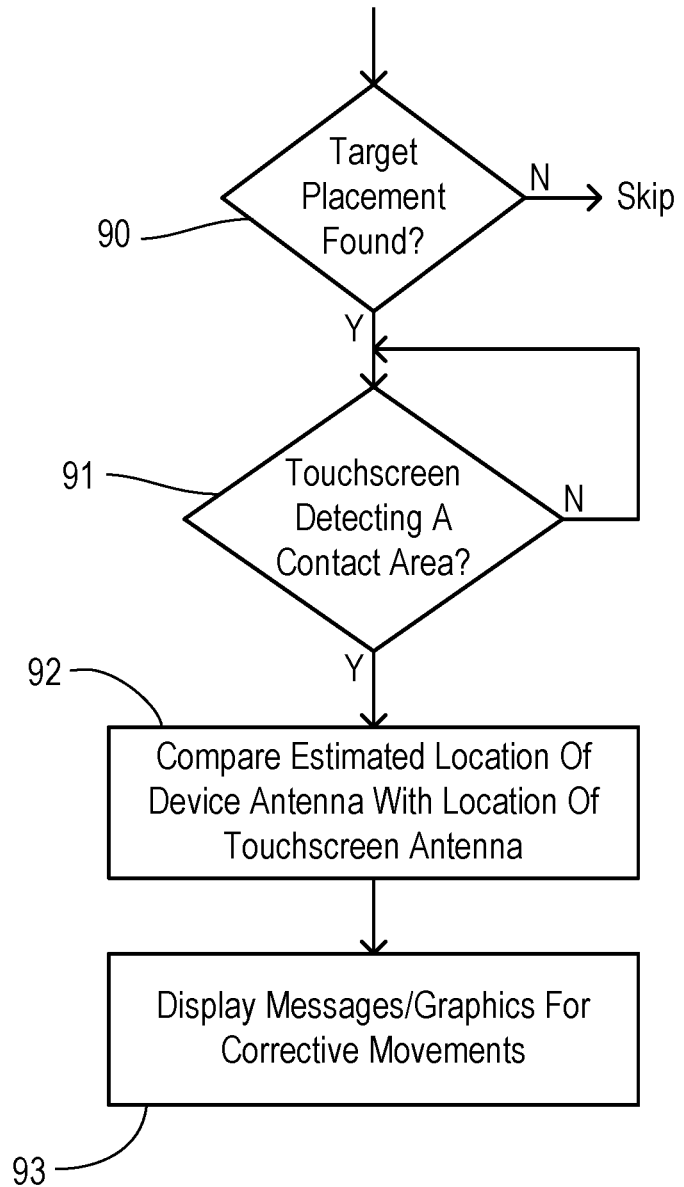
FIG. 10 is a flowchart showing an embodiment of a method for validating placement of the mobile wireless device and assisting a user to move from an incorrect placement to the target placement.

FIG. 10 shows one preferred method for validating placement of a mobile device. A check is performed in step 90 to determine whether a target placement of an actually identified device type has been found. If not, then validation is skipped. Otherwise, a check is performed in step 91 to the determine whether the touchscreen detects a contact area while the selected content is being displayed on the display surface. Once a contact area is found, then an estimated location of the mobile antenna is compared with a location of the touchscreen hidden antenna in step 92. When the locations do not coincide, messages and/or graphic elements are displayed in step 93 to communicate corrective movements so that the mobile device can be repositioned to better couple with the hidden antenna.

What is claimed is:

1. Vehicle apparatus comprising:
   a touchscreen display providing a display surface coincident with a touch-sensitive input detector;
   a near-field communication device having a hidden antenna integrated into the display surface;
   a trigger monitor configured to detect a user activity by a user which is indicative of a potential for the user to attempt pairing of a mobile wireless device with the hidden antenna; and
   a positioning messenger configured to generate a depiction on the display surface indicating a region to be covered on the display surface by the mobile wireless device to align a mobile antenna on the mobile wireless device with the hidden antenna.

2. The vehicle apparatus of claim 1 wherein the positioning messenger comprises a controller which is configured to 1) identify a device type of the mobile wireless device, 2) determine a layout of the mobile antenna, and 3) determine a target placement of the mobile wireless device on the display surface that results in the alignment of the mobile antenna and the hidden antenna.

3. The vehicle apparatus of claim 2 wherein the depiction includes a graphic representation of the mobile wireless device at the determined target placement.

4. The vehicle apparatus of claim 2 wherein the identification of the device type is comprised of retrieving the device type from a stored list of authenticated devices that have been registered to grant access to the vehicle apparatus.

5. The vehicle apparatus of claim 4 wherein the access to the vehicle apparatus is comprised of activating a vehicle powertrain to drive the vehicle apparatus.

6. The vehicle apparatus of claim 4 wherein the identified device type is comprised of a most recently used one of the authenticated devices in the stored list.

7. The vehicle apparatus of claim 2 wherein the identification of the device type is comprised of exchanging messages between the controller and the mobile wireless device.

8. The vehicle apparatus of claim 2 wherein the controller is further configured to 4) determine an actual placement of the mobile wireless device according to the touch-sensitive input detector, 5) determine a difference between the actual placement and the target placement, and 6) generate a movement instruction on the display surface according to the difference.

9. The vehicle apparatus of claim 1 wherein the near-field communication device is comprised of a near-field communication (NFC) reader, and wherein the mobile wireless device is comprised of an NFC security device.

10. The vehicle apparatus of claim 1 wherein the near-field communication device is comprised of a wireless charger for transferring electrical charge to the mobile wireless device.

11. The vehicle apparatus of claim 1 wherein the user activity is comprised of unlocking of an entry door of the vehicle apparatus, opening of the entry door, or an unauthenticated attempt to activate a vehicle powertrain of the vehicle apparatus.

12. The vehicle apparatus of claim 1 wherein the depiction is comprised of a plurality of graphic representations each corresponding to a respective one of a plurality of device types, and wherein each graphic representation indicates a respective target placement for the respective device type.

13. A method of operating a near-field communication device in a vehicle having a touchscreen display providing a display surface coincident with a touch-sensitive input detector, wherein the near-field communication device has a hidden antenna integrated into the display surface, the method comprising the steps of:
    detecting a user activity by a user which is indicative of a potential for the user to attempt pairing of a mobile wireless device with the hidden antenna;
    checking for a device type of the mobile wireless device;
    if at least one device type is detected, then generating a depiction on the display surface indicating a region to be covered on the display surface by a corresponding mobile wireless device to align a mobile antenna on the mobile wireless device with the hidden antenna; and
    if no device type is detected, then generating a depiction on the display surface comprising a plurality of graphic representations each corresponding to a respective one of a plurality of device types, wherein each graphic representation indicates a respective target placement for the respective device type.

14. The method of claim 13 wherein the step of checking for a device type is comprised of retrieving the device type from a stored list of authenticated devices that have been registered to grant access to the vehicle apparatus.

15. The method of claim 13 wherein the detected device type determines a layout of the mobile antenna and a target placement of the mobile wireless device on the display surface that results in the alignment of the mobile antenna and the hidden antenna.

16. The method of claim 13 wherein the detected device type is comprised of a most recently used one of the authenticated devices in the stored list.

17. The method of claim 13 wherein the step of checking for a device type is comprised of exchanging messages with the mobile wireless device.

18. The method of claim 13 further comprising the steps of:
    determining an actual placement of the mobile wireless device according to the touch-sensitive input detector;
    determining a difference between the actual placement and the target placement; and
    generating a movement instruction on the display surface according to the difference.

19. The method of claim 13 wherein the near-field communication device is comprised of a near-field communication (NFC) reader, and wherein the mobile wireless device is comprised of an NFC security device.

20. The method of claim 13 wherein the user activity is comprised of unlocking of an entry door of the vehicle, opening of the entry door, or an unauthenticated attempt to activate a vehicle powertrain of the vehicle.

\* \* \* \* \*